United States Patent
Birsan et al.

(10) Patent No.: US 10,242,108 B2
(45) Date of Patent: Mar. 26, 2019

(54) CONTEXTUALLY RELATED SHARING OF COMMENTARY FOR DIFFERENT PORTIONS OF AN INFORMATION BASE

(71) Applicant: International Business Machines Corporation, Armonk, NY (US)

(72) Inventors: Dorian Birsan, Toronto (CA); Michael J. Harris, Rochester, MN (US); Jana Jenkins, Raleigh, NC (US); James Henry Roberts, Kitchener (CA)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 14/681,219

(22) Filed: Apr. 8, 2015

(65) Prior Publication Data
US 2016/0299974 A1   Oct. 13, 2016

(51) Int. Cl.
*G06F 17/30* (2006.01)
*G06Q 50/00* (2012.01)

(52) U.S. Cl.
CPC .. *G06F 17/30867* (2013.01); *G06F 17/30873* (2013.01); *G06Q 50/01* (2013.01); *G06F 17/3089* (2013.01); *G06F 17/30864* (2013.01)

(58) Field of Classification Search
CPC .......... G06F 17/3089; G06F 17/30864; G06F 17/241; G06F 17/30554; G06F 17/30867; G06F 17/30356; G06F 17/30525; G06F 17/3082
See application file for complete search history.

(56) References Cited

U.S. PATENT DOCUMENTS

| | | | |
|---|---|---|---|
| 7,991,891 B2 | 8/2011 | Kelly et al. | |
| 8,046,259 B1 * | 10/2011 | Siegel | G06Q 10/10 |
| | | | 705/14.73 |
| 9,177,066 B2 * | 11/2015 | Jain | G06F 17/30867 |
| 9,195,679 B1 * | 11/2015 | Svendsen | G06Q 50/01 |
| 9,405,772 B2 * | 8/2016 | Petrou | G06F 17/30277 |
| 9,483,584 B2 * | 11/2016 | Batra | G06F 17/50 |

(Continued)

OTHER PUBLICATIONS

Dalsgaard, Christian, "Social Software: E-Learning Beyond Learning Management Systems," Institute of Information and Media Studies, University of Aarhus, 2006.

*Primary Examiner* — Merilyn P Nguyen
(74) *Attorney, Agent, or Firm* — Steven M. Greenberg, Esq.; Shutts & Bowen LLP

(57) ABSTRACT

Embodiments of the invention provide for contextually related sharing of commentary for different portions of an information base. A method of the invention includes receiving a query for a portion of content in an information base and identifying a portion of different content in the information base that is related to the queried portion. The method also includes retrieving both commentary posted to the information base in respect to the queried portion, and also commentary posted to the information base in respect to the identified portion. Finally, the method includes transmitting the queried portion and the retrieved portion, but annotating the retrieved commentary in respect to the identified portion so as to direct a display of the commentary posted to the information base in respect to the different portion in a manner visually distinguishable from a display of commentary posted to the information base in respect to the queried portion.

12 Claims, 2 Drawing Sheets

(56) References Cited

U.S. PATENT DOCUMENTS

| | | | | |
|---|---|---|---|---|
| 9,659,084 | B1* | 5/2017 | Zhang | G06F 3/04842 |
| 2004/0210602 | A1* | 10/2004 | Hillis | G06F 17/3089 |
| 2005/0256825 | A1* | 11/2005 | Dettinger | G06F 17/3056 |
| 2008/0215571 | A1* | 9/2008 | Huang | G06F 17/30719 |
| 2009/0282002 | A1* | 11/2009 | Reeder | G06Q 30/02 |
| 2012/0110002 | A1* | 5/2012 | Giambalvo | G06F 17/30994 |
| | | | | 707/769 |
| 2012/0158716 | A1* | 6/2012 | Zwol | G06F 17/30247 |
| | | | | 707/728 |
| 2013/0066981 | A1 | 3/2013 | Park et al. | |
| 2013/0097156 | A1 | 4/2013 | Nagaralu | |
| 2013/0166565 | A1 | 6/2013 | Lepsoe | |
| 2014/0074989 | A1* | 3/2014 | Cudak | G06F 17/30902 |
| | | | | 709/219 |
| 2016/0019621 | A1* | 1/2016 | Jnagal | G06Q 30/0625 |
| | | | | 705/26.62 |

* cited by examiner

CONTEXTUALLY RELATED SHARING OF COMMENTARY FOR DIFFERENT PORTIONS OF AN INFORMATION BASE

BACKGROUND OF THE INVENTION

Field of the Invention

The present invention relates to content sharing over the global Internet and more particularly to content commenting in a topical thread of shared content over the global Internet.

Description of the Related Art

Social media provides a natural platform upon which members of the public may share thoughts and ideas with respect to an unlimited number of topics. The platform of social media essentially allows two forms of content sharing—static sharing and dynamic sharing. Static sharing of content refers to content postings by one individual stored in one or more servers and indexed for viewing by other individuals from over the global Internet. In comparison, dynamic sharing of content refers to content postings by one individual stored in one or more servers and indexed for viewing and editing by other individuals from over the global Internet. Thus, the difference between static content sharing and dynamic content sharing is that in the latter instance, an unpredictable number of unknown individuals may attempt to contribute additions or modifications to posted content.

Static content sharing provides a capable mechanism through which product documentation for a product can be structured and distributed. In particular, unlike conventional printed documentation for a product, static content sharing provides a way to distribute electronically to any number of end users a most recent documentation of a product in a way that is readily accessible and even searchable to the end user. Dynamic content sharing provides an even better mechanism through which product documentation for a product can be structure and distributed in as much as the static content provided by the product manufacturer can be supplemented with the on-going commentary of the general public.

Of note, it is desirable to permit different individuals to add commentary to different portions of the product documentation. Typical commentary would include corrections, remarks, questions and answers to questions all pertinent to a topic of an associated portion of the product documentation. As such, commentary supplementing different portions of product documentation is akin to appending a thread of discussion to the different portions of the product documentation.

As it will be recognized, product documentation oftentimes is limited to a particular version of a product. While the product documentation for many different versions of the same product may enjoy the identical or nearly identical content so that the same product documentation may be provided for multiple versions of the product, at some point, the different versions will vary enough to warrant different product documentation—even if much of the content remains similar or identical. In the latter instance, the product documentation for each different version of a product can be distributed as merely hierarchical branches of root product documentation.

Maintaining the product documentation for different versions in separate branches of a hierarchy of documentation for a product can be advantageous in so far as an end user can navigate to the product documentation in general irrespective of any particular version of the product, and then the end user can select to browse the specific product documentation for a corresponding version of the product of choice. Likewise, one providing supplemental content in respect to a portion of product documentation pertaining to one version can do so by navigating the hierarchy of the product documentation to the portion of the product documentation pertaining to the one version. However, to the extent that the portion in which the supplemental content is provided is similar to or identical to another portion of the product documentation for a different version of the product, the other portion will not receive the benefit of the supplemental content.

BRIEF SUMMARY OF THE INVENTION

Embodiments of the present invention address deficiencies of the art in respect to the management of supplemental content in dynamic content sharing and provide a novel and non-obvious method, system and computer program product for contextually related sharing of commentary for different portions of an information base. In an embodiment of the invention, a method for contextually related sharing of commentary for different portions of an information base includes receiving from a remote content browser, a query for a portion of content in an information base managed by a content distribution system executing memory of a host computing system and identifying a portion of different content in the information base that is related to the queried portion. The method also includes retrieving both commentary posted to the information base in respect to the queried portion, and also commentary posted to the information base in respect to the identified portion. Finally, the method includes transmitting to the remote content browser the queried portion and the retrieved portion, but annotating the retrieved commentary posted to the information base in respect to the identified portion so as to direct a display of the commentary posted to the information base in respect to the different portion in a manner visually distinguishable from a display of the commentary posted to the Information base in respect to the queried portion.

In one aspect of the embodiment, the queried portion of content is a portion of documentation for a product and wherein the identified portion of the different content is a portion of documentation for a different product. In another aspect of the embodiment, the queried portion of content is a portion of documentation for one version of a product and wherein the identified portion of the different content is a portion of documentation for another version of the product. In yet another aspect of the embodiment, the different portion is identified based upon a topic heading of the different portion being similar to a topic heading of the queried portion.

In another embodiment of the invention, a dynamic content sharing data processing system is configured for contextually related sharing of commentary for different portions of an information base. The system includes a host computing system that includes at least one computer with memory and at least one processor and an information base coupled to the host computing system and storing different portions of different content and commentary corresponding to the different portions. The system also includes a content server serving the different portions of the different content to requesting end users over a computer communications network. Finally, the system includes a contextually related commentary sharing module.

The module includes program code executing in the memory of the host computing system so as to receive a query for a portion of content in the information base and to identify a portion of different content in the information base that is related to the queried portion. The program code is further enabled to retrieve both commentary posted to the information base in respect to the queried portion, and also commentary posted to the information base in respect to the identified portion. Finally, the program code is enabled to transmit to the remote content browser the queried portion and the retrieved portion, but to annotate the retrieved commentary posted to the information base in respect to the identified portion so as to direct a display of the commentary posted to the information base in respect to the different portion in a manner visually distinguishable from a display of the commentary posted to the information base in respect to the queried portion.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for contextually related sharing of commentary for different portions of an information base. In accordance with an embodiment of the invention, a search query can be received for a portion of one version of content. In response, supplementary commentary stored in connection with the portion of the one version of content can be retrieved from storage and displayed in connection with the portion of the one version of content. As well, a portion of another version of the content can be identified and the supplementary commentary stored in connection with the portion of the other version of the content can be retrieved. Thereafter, the supplementary commentary stored in connection with the portion of the other version can be displayed adjacent to the supplementary commentary stored in connection with the portion of the one version of the content, but the supplementary commentary stored in connection with the portion of the other version can be visually distinguished from other commentary displayed in connection with the portion of the one version of the content.

Figure 1:
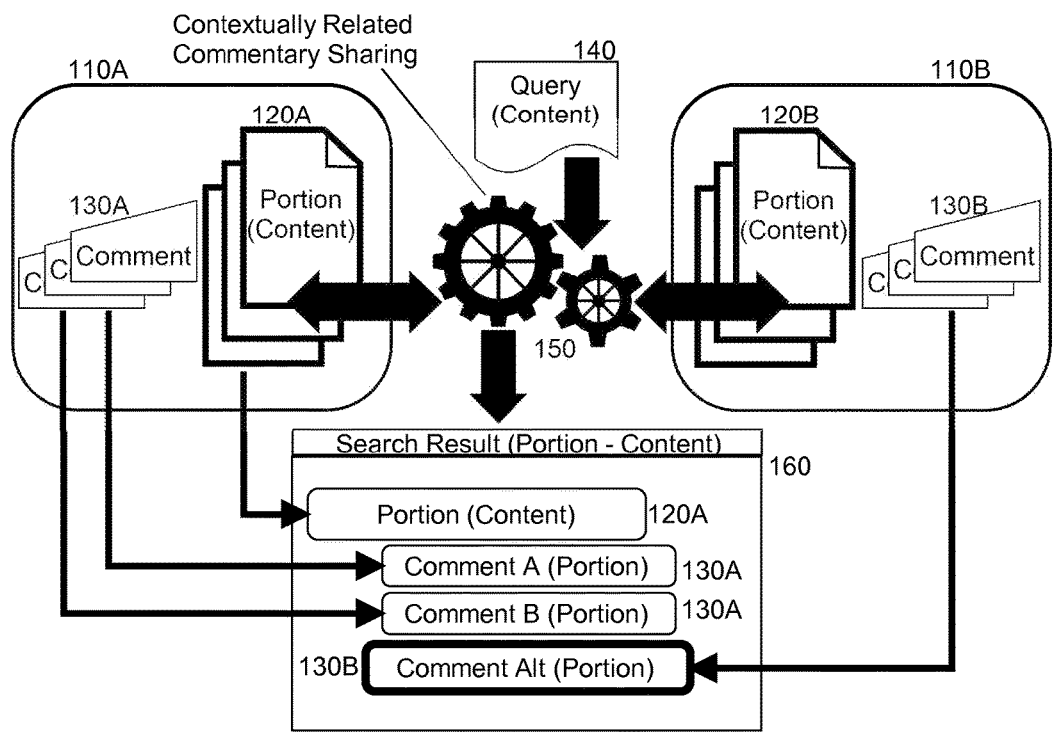
FIG. 1 is a pictorial illustration of a process for contextually related sharing of commentary for different portions of an information base.

In further illustration, FIG. 1 pictorially shows a process for contextually related sharing of commentary for different portions of an information base. As shown in FIG. 1, a query 140 for a portion of content can be received by contextually related commentary sharing logic 150. The query 140 can be processed against an information base 110A of different portions 120A of content so as to identify a particular portion 120A of the content corresponding to the query 140. Commentary 130A provided in the information base 110A in connection with the particular one of the different portions 130A can be identified as well. Of note, related portions 120B of content for the query 140 in an information base 110B also can be identified along with commentary 130B in that the information base 110B may be different than that of information base 110A, or the information base 110B may be the same as that of information base 130A.

Thereafter, the commentary 130A, 130B can be displayed in a search result user interface 160 in connection with the portion of content 120A corresponding to the query 140. Preferably, the commentary 130B can be displayed in a manner that is visually distinguishable from the commentary 130A so as to indicate that the commentary 130B had been posted in connection with the portion of content 120B and not the portion of content 120A. For example, the commentary 130B can be presented in a color, font or font size that is different than that of the commentary 130A, or visual decorators can be included adjacent to the commentary 130B so as to emphasize a distinction between the commentary 130B and the commentary 130A.

Figure 2:
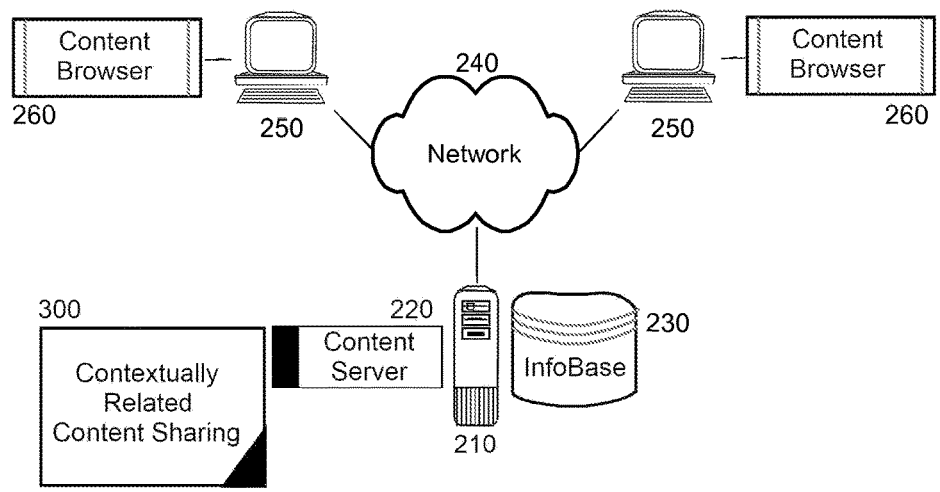
FIG. 2 is a schematic illustration of a dynamic content sharing data processing system configured for contextually related sharing of commentary for different portions of an information base; and, FIG. 3 is a flow chart illustrating a process for contextually related sharing of commentary for different portions of an information base.

The process described in connection with FIG. 1 can be implemented in a data processing system. In yet further illustration, FIG. 2 schematically shows a dynamic content sharing data processing system configured for contextually related sharing of commentary for different portions of an information base. The system can include a host computing system 210 that includes one or more computers, each with memory and at least one processor. The host computing system can support the operation of a content server 220 serving different portions of different content form an information base 230 to different content browsers 260 hosted in different computers 250 from over a computer communications network 240. In this regard, the different portions of content in the information base 230 can correspond to different topics of product documentation and different content can be different documentation for different versions of the same product or different products.

Notably, a contextually related content sharing module 300 can be coupled to the content server 220. The contextually related content sharing module 300 can include program code enabled upon execution in the memory of the host computing system 210 to receive a search query for a portion of one version of content in the information base 230 and to respond to the query by retrieving supplementary commentary stored in the information base 230 in connection with the portion of the one version of content. The program code is further enabled to display the portion of the one version of the content and the supplementary commentary in a content browser 260 in connection with the portion of the one version of content.

As well, the program code is enabled to identify a portion of another version of the content in the information base 230 and to retrieve from the information base 230 the supplementary commentary stored in connection with the portion of the other version of the content. Thereafter, the program code is enabled to display the supplementary commentary stored in connection with the portion of the other version adjacent to the supplementary commentary stored in connection with the portion of the one version of the content. However, the program code is enabled to visually distinguish the supplementary commentary stored in connection with the portion of the other version from other commentary displayed in connection with the portion of the one version of the content.

Figure 3:
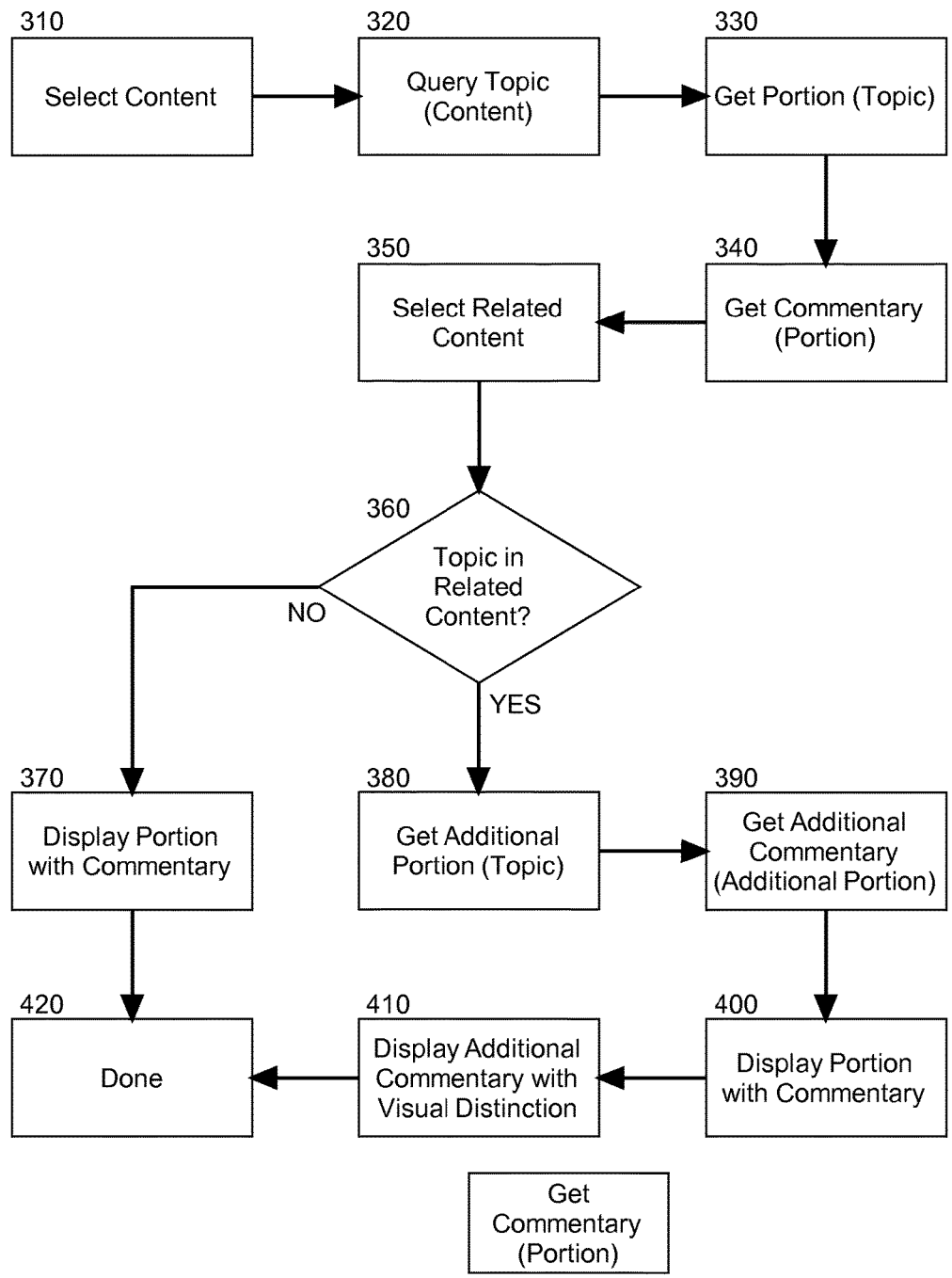

In even yet further illustration of the operation of the contextually related content sharing module 300, FIG. 3 is a flow chart illustrating a process for contextually related sharing of commentary for different portions of an information base. Beginning in block 310, content in an information base can be selected and in block 320, a topic in the selected content can be queried. In block 330, a portion of the content corresponding to the query can be located along with corresponding commentary in block 340. Thereafter, related content to the selected content can be additionally selected.

In this regard, related content can be additionally selected by searching the information base for content stored with a URL similar to a URL for the initially selected content, or by locating content with a topical hierarchy similar to that of the selected content, or by locating content with a title similar to that of the selected content, or by locating content with a heading similar to that of the selected content. Other mechanisms for identifying related content include identifying structural elements of the content such as markup language tags and comparing the identified structural elements to similar structural elements in other content so as to select related content annotated thereby.

In decision block 350, it can be determined whether or not the queried topic can also be located in the related content. If not, the portion of the selected content can be displayed along with the corresponding content in block 370 and the process can end in block 420. Otherwise, the process can continue in block 380. In block 380, an additional portion of the related content can be matched to the queried topic and in block 390, additional commentary posted in connection with the additional portion can be retrieved. Thereafter, in block 400 the portion of the selected content can be displayed along with the corresponding content. Additionally, in block 410, the additional commentary posted in connection with the additional portion also can be displayed in connection with the portion of the selected content. Finally, in block 420 the process can end.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for contextually related sharing of commentary for different portions of an information base, the method comprising:
    receiving from a remote content browser, a query for a portion of content in an information base managed by a content distribution system executing memory of a host computing system, the portion of the content having a particular topic; and,
    retrieving the queried portion of the content from the information base and determining if a different portion of different content also has the particular topic by:
        additionally formulating a different query based upon the topic of the retrieved queried portion and issuing the different query to the information base so as to retrieve a different portion of different content in the information base of the same particular topic;
        retrieving commentary posted to the information base in respect to the queried portion, and separately retrieving commentary posted to the information base in respect to the different portion that is different from the queried portion; and,
        responding to the query by transmitting to the remote content browser in a single search result for display in the remote content browser, the queried portion, the different portion and both the retrieved commentary posted to the information base that is related to the queried portion, and also the retrieved commentary posted to the information base in respect to the different portion that is different from the queried portion, wherein the retrieved commentary posted to the information base that is related to the queried portion is displayed adjacent to the retrieved commentary posted to the information base in respect to the different portion that is different from the queried portion, with the retrieved commentary posted to the information base that is related to the queried portion is presented in the search result in a manner that is visually different than the retrieved commentary posted to the information base in respect to the different portion so that all commentary retrieved in connection with the queried portion has one visual appearance, while all commentary retrieved in connection with the different portion as a second, different visual appearance.

2. The method of claim 1, wherein the queried portion of content is a portion of documentation for a product and wherein the different portion is a portion of documentation for a different product.

3. The method of claim 1, wherein the queried portion of content is a portion of documentation for one version of a product and wherein the different portion is a portion of documentation for another version of the product.

4. The method of claim 1, wherein the different portion is identified based upon a topic heading of the different portion being similar to a topic heading of the queried portion.

5. A dynamic content sharing data processing system configured for contextually related sharing of commentary for different portions of an information base, the system comprising:
    a host computing system comprising at least one computer with memory and at least one processor;

an information base coupled to the host computing system and storing different portions of different content and commentary corresponding to the different portions;

a content server serving the different portions of the different content to requesting end users over a computer communications network; and, a contextually related commentary sharing module comprising program code executing in the memory of the host computing system so as to:

receive a query for a portion of content in the information base, the portion of the content having a particular topic, to retrieve the queried portion of the content from the information base and determine if a different portion of different content also has the particular topic by:

additionally formulating a different query based upon the retrieved queried portion and issuing the different query to in the information base so as to retrieve a different portion of different content in the information base of the same particular topic, retrieving commentary posted to the information base in respect to the queried portion that is different from the queried portion, and separately retrieving commentary posted to the information base in respect to the different portion, and to respond to the query by transmitting to the remote content browser in a single search result for display in the remote content browser, the queried portion, the different portion and both the retrieved commentary posted to the information base that is related to the queried portion, and also the retrieved commentary posted to the information base in respect to the different portion that is different from the queried portion, wherein the retrieved commentary posted to the information base that is related to the queried portion is displayed adjacent to the retrieved commentary posted to the information base in respect to the different portion that is different from the queried portion, with the retrieved commentary posted to the information base that is related to the queried portion is presented in the search result in a manner that is visually different than the retrieved commentary posted to the information base in respect to the different portion so that all commentary retrieved in connection with the queried portion has one visual appearance, while all commentary retrieved in connection with the different portion as a second, different visual appearance.

6. The system of claim 5, wherein the queried portion of content is a portion of documentation for a product and wherein the different portion is a portion of documentation for a different product.

7. The system of claim 5, wherein the queried portion of content is a portion of documentation for one version of a product and wherein the different portion is a portion of documentation for another version of the product.

8. The system of claim 5, wherein the different portion is identified based upon a topic heading of the different portion being similar to a topic heading of the queried portion.

9. A computer program product for contextually related sharing of commentary for different portions of an information base, the computer program product comprising a computer readable storage medium having program instructions embodied therewith, the program instructions executable by a device to cause the device to perform a method comprising:

receiving from a remote content browser, a query for a portion of content in an information base managed by a content distribution system executing memory of a host computing system, the portion of the content having a particular topic; and, retrieving the queried portion of the content from the information base and determining if a different portion of different content also has the particular topic by:

additionally formulating a different query based upon the topic of the retrieved queried portion and issuing the different query to the information base so as to retrieve a different portion of different content in the information base of the same particular topic;

retrieving commentary posted to the information base in respect to the queried portion, and separately retrieving commentary posted to the information base in respect to the different portion that is different from the queried portion; and, responding to the query by transmitting to the remote content browser in a single search result for display in the remote content browser, the queried portion, the different portion and both the retrieved commentary posted to the information base that is related to the queried portion, and also the retrieved commentary posted to the information base in respect to the different portion that is different from the queried portion, wherein the retrieved commentary posted to the information base that is related to the queried portion is displayed adjacent to the retrieved commentary posted to the information base in respect to the different portion that is different from the queried portion, with the retrieved commentary posted to the information base that is related to the queried portion is presented in the search result in a manner that is visually different than the retrieved commentary posted to the information base in respect to the different portion so that all commentary retrieved in connection with the queried portion has one visual appearance, while all commentary retrieved in connection with the different portion as a second, different visual appearance.

10. The computer program product of claim 9, wherein the queried portion of content is a portion of documentation for a product and wherein the different portion is a portion of documentation for a different product.

11. The computer program product of claim 9, wherein the queried portion of content is a portion of documentation for one version of a product and wherein the different portion is a portion of documentation for another version of the product.

12. The computer program product of claim 9, wherein the different portion is identified based upon a topic heading of the different portion being similar to a topic heading of the queried portion.

* * * * *